US009906480B2

United States Patent
Steiner et al.

(10) Patent No.: US 9,906,480 B2
(45) Date of Patent: Feb. 27, 2018

(54) TECHNIQUES FOR EPHEMERAL MESSAGING WITH LEGACY CLIENTS

(71) Applicant: Facebook, Inc., Menlo Park, CA (US)

(72) Inventors: Matthew Steiner, Los Altos, CA (US); Jeremy Fein, New York, NY (US); Erik Murphy-Chutorian, Palo Alto, CA (US); Ting Yang, Princeton, NJ (US); Alvin Portillo, Palo Alto, CA (US)

(73) Assignee: FACEBOOK, INC., Menlo Park, CA (US)

( * ) Notice: Subject to any disclaimer, the term of this patent is extended or adjusted under 35 U.S.C. 154(b) by 151 days.

(21) Appl. No.: 14/965,623

(22) Filed: Dec. 10, 2015

(65) Prior Publication Data

US 2017/0171131 A1  Jun. 15, 2017

(51) Int. Cl.
*H04L 12/58* (2006.01)
*H04L 29/06* (2006.01)

(52) U.S. Cl.
CPC .............. *H04L 51/22* (2013.01); *H04L 67/42* (2013.01)

(58) Field of Classification Search
CPC ......... H04L 51/22; H04L 51/16; H04L 51/24; H04L 51/26; H04L 67/42
USPC ........................................................ 709/206
See application file for complete search history.

(56) References Cited

U.S. PATENT DOCUMENTS

| | | | |
|---|---|---|---|
| 5,964,841 A * | 10/1999 | Rekhter | H04L 45/02 370/255 |
| 7,565,407 B1 * | 7/2009 | Hayball | G06F 17/30902 709/200 |
| 8,972,556 B2 * | 3/2015 | Kavanaugh | H04L 43/10 370/310 |
| 9,237,202 B1 | 1/2016 | Sehn | |
| 9,384,112 B2 * | 7/2016 | Petersen | G06F 11/0709 |
| 9,584,493 B1 * | 2/2017 | Leavy | H04L 63/104 |
| 9,654,494 B2 * | 5/2017 | Hentunen | H04L 63/1441 |
| 9,706,398 B2 * | 7/2017 | Frederick | H04W 12/06 |
| 2003/0009594 A1 * | 1/2003 | McElligott | H04L 29/06 709/245 |
| 2003/0212738 A1 * | 11/2003 | Wookey | H04L 51/30 709/203 |

(Continued)

OTHER PUBLICATIONS

Office Action received for U.S. Appl. No. 14/965,632, dated Oct. 6, 2017, 31 pages.

*Primary Examiner* — Alina N Boutah

(57) ABSTRACT

Techniques for ephemeral message are described. In one embodiment, an apparatus may comprise a sender inbound messaging component operative to receive an incoming update for a message queue at a client support server for a messaging system from a messaging client on a client device; a legacy client support component operative to determine whether the messaging client supports a client-side time-to-live setting; determine whether the incoming update should be associated with a server-specified time-to-live setting where the messaging client does not support the client-side time-to-live setting; and assign the incoming update the server-specified time-to-live setting where the messaging client does not support the client-side time-to-live setting and where the incoming update should be associated with a server-side time-to-live setting. Other embodiments are described and claimed.

20 Claims, 13 Drawing Sheets

(56) References Cited

U.S. PATENT DOCUMENTS

| | | | |
|---|---|---|---|
| 2004/0083264 A1* | 4/2004 | Veselov | H04L 12/1822 709/204 |
| 2005/0076090 A1 | 4/2005 | Thuerk | |
| 2005/0076114 A1* | 4/2005 | Cook | H04L 29/06 709/224 |
| 2005/0262055 A1* | 11/2005 | Newport | G06F 9/466 |
| 2006/0141981 A1* | 6/2006 | Lin | H04L 29/12122 455/403 |
| 2007/0156834 A1 | 7/2007 | Nikolov et al. | |
| 2008/0298235 A1* | 12/2008 | Neugebauer | H04L 43/0864 370/232 |
| 2010/0095308 A1 | 4/2010 | Blue et al. | |
| 2010/0251262 A1* | 9/2010 | Rokicki | G06F 9/546 719/314 |
| 2011/0099233 A1* | 4/2011 | Calder | G06F 9/546 709/206 |
| 2011/0264781 A1* | 10/2011 | Moser | H04L 61/1523 709/223 |
| 2011/0296011 A1* | 12/2011 | Dare | G06F 9/544 709/224 |
| 2012/0254386 A1* | 10/2012 | Smith | H04L 29/12066 709/223 |
| 2013/0042001 A1 | 2/2013 | Gould et al. | |
| 2014/0068196 A1* | 3/2014 | Benoit | H04L 67/2852 711/135 |
| 2015/0067032 A1* | 3/2015 | Djabarov | H04W 4/021 709/203 |
| 2015/0135302 A1* | 5/2015 | Cohen | H04L 67/2823 726/12 |
| 2015/0180892 A1* | 6/2015 | Balderas | H04L 63/1416 726/11 |
| 2015/0350321 A1* | 12/2015 | Klose | H04L 67/1097 709/217 |
| 2015/0358343 A1* | 12/2015 | Segal | H04L 63/1425 726/23 |
| 2015/0365358 A1* | 12/2015 | Strassner | H04L 51/14 709/206 |
| 2016/0019608 A1* | 1/2016 | Smith | G06Q 30/0281 705/346 |
| 2016/0164816 A1* | 6/2016 | Bhagwan | H04L 51/18 709/206 |
| 2016/0205054 A1 | 7/2016 | Lu et al. | |
| 2017/0041266 A1* | 2/2017 | Walkin | H04L 67/142 |

* cited by examiner

*500*

```
Wake a delayed-action worker according to a wake timer.
502

Determine a current update object for a delayed-action cursor for a recipient
update queue for a messaging system, the delayed-action cursor associated
with an action delay for the recipient update queue.
504

Determine a delayed-action activity for the current update object.
506

Perform the delay-action activity for the current update object.
508

Determine a next update object for the delayed-action cursor for the
recipient update queue.
510

Determine a next wake timer for the delayed-action worker based on the
action delay and a creation time for the next update object.
512
```

*FIG. 5A*

TECHNIQUES FOR EPHEMERAL MESSAGING WITH LEGACY CLIENTS

RELATED APPLICATIONS

This application is related to U.S. patent application Ser. No. 14/621,846, titled "Techniques for a Persistent Queue for Message Syncing," filed on Feb. 13, 2015, which is hereby incorporated by reference in its entirety.

This application is related to U.S. patent application Ser. No. 14/621,851, titled "Techniques for a Sequential Message Reader for Message Syncing," filed on Feb. 13, 2015, which is hereby incorporated by reference in its entirety.

This application is related to U.S. patent application Ser. No. 14/621,865, titled "Techniques for Hot Snapshots for Message Syncing," filed on Feb. 13, 2015, which is hereby incorporated by reference in its entirety.

This application is related to U.S. patent application Ser. No. 14/621,875, titled "Techniques for Intelligent Messaging for Message Syncing," filed on Feb. 13, 2015, which is hereby incorporated by reference in its entirety.

This application is related to a U.S. patent application "Techniques for Ephemeral Messaging with a Message Queue,"Ser. No. 14/965,632 filed on Dec. 10, 2015, which is hereby incorporated by reference in its entirety.

BACKGROUND

Internet users may engage in communication with each other, such as through the exchange of messages. Users may compose messages to each other on computing devices and transmit them to each other, such as via an intermediary messaging platform. Users may have accounts registered with the intermediary messaging platform establishing an address at which they may be contacted. The users may compose and submit their messages using these addresses. Users may receive their correspondence at their address by accessing the intermediary messaging platform with their address and a password associated with their account.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques for ephemeral messaging. Some embodiments are particularly directed to techniques for ephemeral messaging with a message queue and with legacy clients. In one embodiment, for example, an apparatus may comprise a delayed-action worker module operative to wake according to a wake timer; determine a current update object for a delayed-action cursor for a recipient update queue for a messaging system, the delayed-action cursor associated with an action delay for the recipient update queue; determine a delayed-action activity for the current update object; perform the delay-action activity for the current update object; determine a next update object for the delayed-action cursor for the recipient update queue; and determine a next wake timer for the delayed-action worker module based on the action delay and a creation time for the next update object. Other embodiments are described and claimed. In another embodiment, for example, an apparatus may comprise a sender inbound messaging component operative to receive an incoming update for a message queue at a client support server for a messaging system from a messaging client on a client device; a legacy client support component operative to determine whether the messaging client supports a client-side time-to-live setting; determine whether the incoming update should be associated with a server-specified time-to-live setting where the messaging client does not support the client-side time-to-live setting; and assign the incoming update the server-specified time-to-live setting where the messaging client does not support the client-side time-to-live setting and where the incoming update should be associated with a server-side time-to-live setting.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
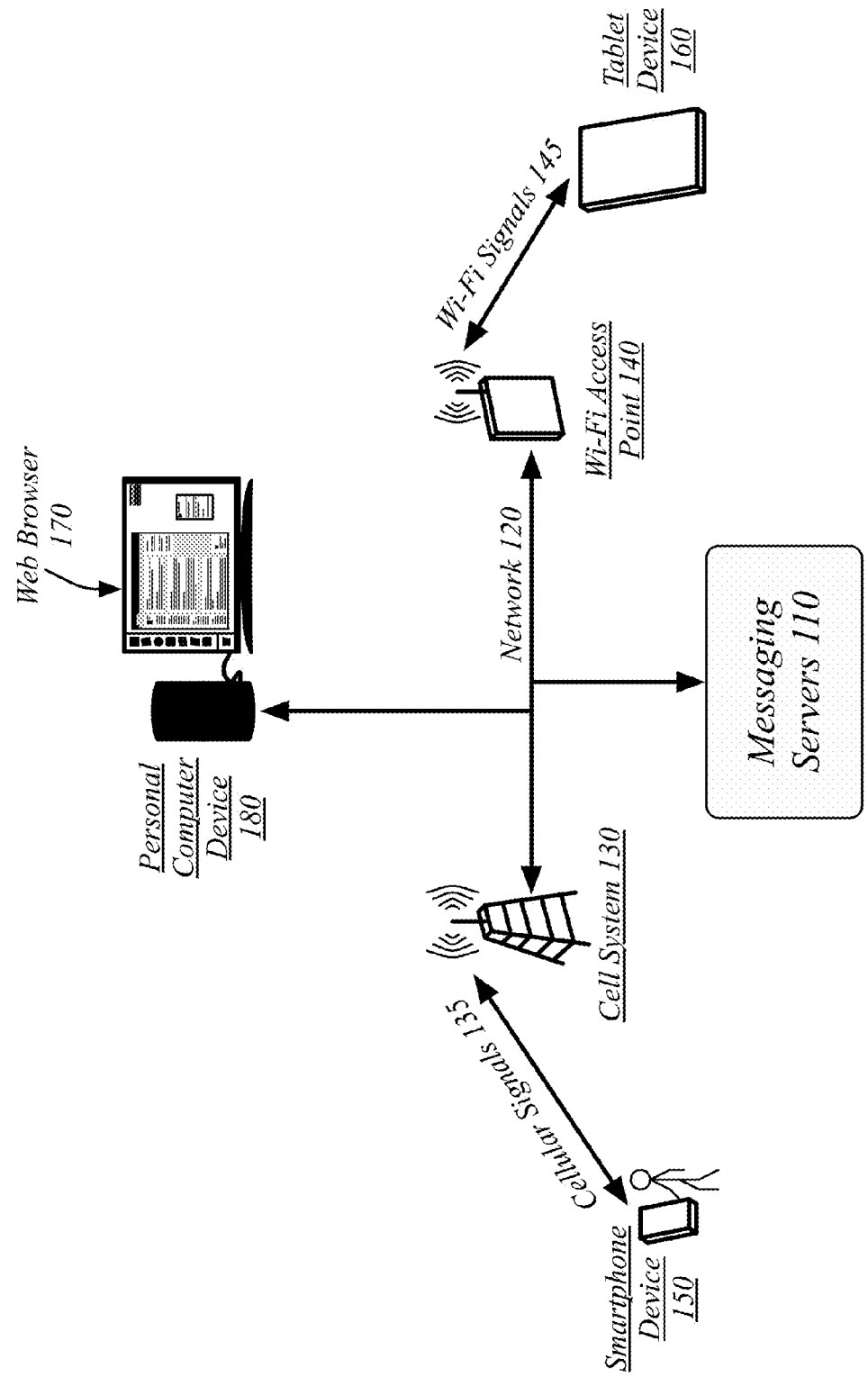
FIG. 1 illustrates an embodiment of a messaging system.

Users of a messaging system may exchange messages, which may comprise one or both of text and media, such as images, sounds, animated images, and video, without limitation. In some cases, users may desire to have at least some of these messages be automatically removed after a particular duration. This may serve to enhance the privacy of their messaging exchanges. A messaging system may benefit from offering an automatic-delete feature. The messaging system may benefit from offering this feature using techniques that are computationally efficient.

In one embodiment, messages that are to be deleted may be marked for deletion by a sending messaging client. However, when introducing this feature into a messaging system, some legacy clients may not support the marking of messages. As such, the messaging system may benefit from efficiently tracking what messages should be marked for deletion on behalf of legacy clients.

It will be appreciated that the techniques described herein may be applied to tasks other than the performance of ephemeral messaging. In general, any delayed-action task may be benefit from efficient traversal of a message queue and for support for legacy clients.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-a may include components 122-1, 122-2, 122-3, 122-4 and 122-5. The embodiments are not limited in this context.

FIG. 1 illustrates a block diagram for a messaging system 100. In one embodiment, the messaging system 100 may comprise a computer-implemented system having software applications comprising one or more components. Although the messaging system 100 shown in FIG. 1 has a limited number of elements in a certain topology, it may be appreciated that the messaging system 100 may include more or less elements in alternate topologies as desired for a given implementation.

The messaging servers 110 may comprise one or more messaging servers operated by a messaging platform as part of the messaging system 100. A messaging server may comprise an Internet-accessible server, with the network 120 connecting the various devices of the messaging system 100 comprising, at least in part, the Internet.

A user may own and operate a smartphone device 150. The smartphone device 150 may comprise an iPhone® device, an Android® device, a Blackberry® device, or any other mobile computing device conforming to a smartphone form. The smartphone device 150 may be a cellular device capable of connecting to a network 120 via a cell system 130 using cellular signals 135. In some embodiments and in some cases the smartphone device 150 may additionally or alternatively use Wi-Fi or other networking technologies to connect to the network 120. The smartphone device 150 may execute a messaging client, web browser, or other local application to access the messaging servers 110.

The same user may own and operate a tablet device 160. The tablet device 150 may comprise an iPad® device, an Android® tablet device, a Kindle Fire® device, or any other mobile computing device conforming to a tablet form. The tablet device 160 may be a Wi-Fi device capable of connecting to a network 120 via a Wi-Fi access point 140 using Wi-Fi signals 145. In some embodiments and in some cases the tablet device 160 may additionally or alternatively use cellular or other networking technologies to connect to the network 120. The tablet device 160 may execute a messaging client, web browser, or other local application to access the messaging servers 110.

The same user may own and operate a personal computer device 180. The personal computer device 180 may comprise a Mac OS® device, Windows® device, Linux® device, or other computer device running another operating system. The personal computer device 180 may be an Ethernet device capable of connecting to a network 120 via an Ethernet connection. In some embodiments and in some cases the personal computer device 180 may additionally or alternatively use cellular, Wi-Fi, or other networking technologies to the network 120. The personal computer device 180 may execute a messaging client, web browser 170, or other local application to access the messaging servers 110.

A messaging client may be a dedicated messaging client. A dedicated messaging client may be specifically associated with a messaging provider administering the messaging platform including the messaging servers 110. A dedicated messaging client may be a general client operative to work with a plurality of different messaging providers including the messaging provider administering the messaging platform including the messaging servers 110.

The messaging client may be a component of an application providing additional functionality. For example, a social networking service may provide a social networking application for use on a mobile device for accessing and using the social networking service. The social networking service may include messaging functionality such as may be provided by messaging servers 110. It will be appreciated that the messaging servers 110 may be one component of a computing device for the social networking service, with the computing device providing additional functionality of the social networking service. Similarly, the social networking application may provide both messaging functionality and additional social networking functionality.

In some cases a messaging endpoint may retain state between user sessions and in some cases a messaging endpoint may relinquish state between user session. A messaging endpoint may use a local store to retain the current state of a message inbox. This local store may be saved in persistent storage such that the state may be retrieved between one session and the next, including situations in which, for example, a local application is quit or otherwise removed from memory or a device is powered off and on again. Alternatively, a messaging endpoint may use a memory cache to retain the current state of a message inbox but refrain from committing the state of the message inbox to persistent storage.

A messaging endpoint that retains the state of a message inbox may comprise a dedicated messaging application or a messaging utility integrated into another local application, such as a social networking application. A messaging endpoint that relinquishes state of a message inbox may comprise messaging access implemented within a web browser. In one embodiment, a web browser, such as web browser 170 executing on personal computer device 180, may execute HTML5 code that interacts with the messaging server to present messaging functionality to a user.

A user may send and receive messages from a plurality of devices, including the smartphone device 150, tablet device 160, and personal computer device 180. The user may use a first messaging application on the smartphone device 150, a second messaging application on the tablet device 160, and the web browser 170 on the personal computer device 180. The first and second messaging applications may comprise installations of the same application on both devices. The first and second messaging applications may comprise a smartphone-specific and a tablet-specific version of a common application. The first and second messaging application may comprise distinct applications.

The user may benefit from having their message inbox kept consistent between their devices. A user may use their smartphone device 150 on the cell system 130 while away from their home, sending and receiving messages via the cells system 130. The user may stop by a coffee shop, or other location offering Wi-Fi, and connect their tablet device 160 to a Wi-Fi access point 140. The tablet device 160 may retrieve its existing known state for the message inbox and receive updates that have happened since the last occasion on which the tablet device 160 had access to a network, including any messages sent by the smartphone device 150 and that may have been received by the user while operating the smartphone device 150. The user may then return home and access their message inbox using a web browser 170 on a personal computer device 180. The web browser 170 may receive a snapshot of the current state of the message inbox from the messaging servers 110 due to it not maintaining or otherwise not having access to an existing state for the message inbox. The web browser 170 may then retrieve incremental updates for any new changes to the state of the message inbox so long as it maintains a user session with the messaging servers 110, discarding its known state for the message inbox at the end of the session, such as when the web browser 170 is closed by the user. Without limitation, an update may correspond to the addition of a message to a mailbox, a deletion of a message from a mailbox, and a read receipt.

A messaging system 100 may operate by defining a messaging inbox as comprising a plurality of messages, wherein each message is an individual transaction of communication between two or more participants. A mail server may operate by maintaining a message index for the messaging inbox. Mail servers may receive messages and store the messages in mail archives from which messages may be retrieved through reference to the message index. Mail clients may connect to the mail servers and retrieve messages that have been added to their mail archive since their last update. The mail clients may receive a mail index from the mail archive indicating what messages are stored in the mail archive. The mail clients may compare the mail archive to their current inbox in order to determine what messages they are missing, which they then request from the mail archive. The mail clients may make changes to their inbox, which results in mail inbox instructions being transmitted to the mail archives instructing the mail archives in modifications to make to the representation of their mail inbox on the mail archives.

Messaging interactions mediated by a messaging system may be organized into shared spaces known as message threads. A message thread may collect together the messages shared between a particular group of users. Messages sent individually between a pair of users may be collected into a one-on-one message thread uniquely associated with the private messaging between the pair of users. Messages sent between a group of three or more users may not be uniquely defined by their membership, but instead by, in some embodiments, an identifier uniquely identifying the group thread. Membership in a group thread may, in some embodiments, vary over time, adding and/or losing members.

The messaging system 100 may use knowledge generated from interactions in between users. The messaging system 100 may comprise a component of a social-networking system and may use knowledge generated from the broader interactions of the social-networking system. As such, to protect the privacy of the users of the messaging system 100 and the larger social-networking system, messaging system 100 may include an authorization server (or other suitable component(s)) that allows users to opt in to or opt out of having their actions logged by the messaging system 100 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of the messaging system 100 and other elements of a social-networking system through blocking, data hashing, anonymization, or other suitable techniques as appropriate.

Figure 2A:
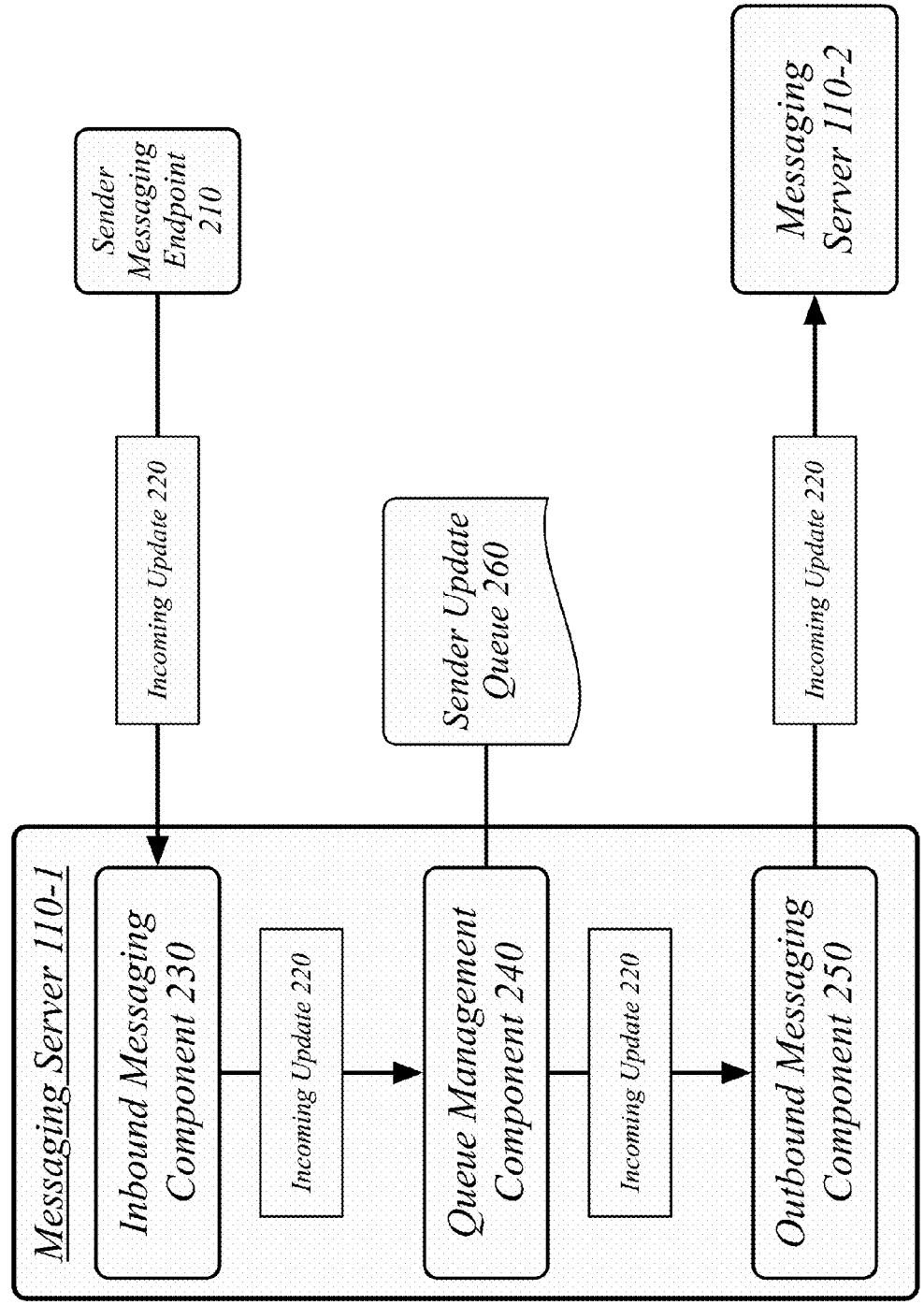
FIG. 2A illustrates an embodiment of a messaging server managing a sender update queue.

FIG. 2A illustrates an embodiment of a messaging server 110-1 managing a sender update queue 260.

A messaging server of the plurality of messaging servers 110, such as messaging server 110-1, may comprise an inbound messaging component 230. The inbound messaging component 230 may be generally arranged to receive an incoming update 220 for an update queue, such as sender update queue 260, the sender update queue 260 associated with a recipient of the incoming update 220. The messaging server 110-1 may comprise a messaging server to which the sender is assigned, or may comprise a server currently executing various processes, such as messaging workers, executing functions for the messaging system 100.

A messaging server may comprise a queue management component 240. The queue management component 240 may be operative to manage an update queue, such as sender update queue 260.

A messaging server may comprise an outbound messaging component 250. The outbound messaging component may be operative to transmit the incoming update 220 to further systems for processing, such a sender messaging endpoint 110 or a further messaging server 110-2 providing an update queue for a recipient of the incoming update 220.

A sender messaging endpoint 210 may represent any one of a plurality of messaging endpoints used by a user in conjunction with a messaging platform. The incoming update 220 may represent any one of a plurality of types of updates supported by the messaging system 100. The incoming update 220 may generally correspond to an atomic modification to a message inbox. The incoming update 220 may comprise a new message addressed to one or more users of the messaging system 100. The incoming update 220 may comprise a deletion from a message inbox of a message. The incoming update 220 may comprise a notification that a message received by the sender of the incoming update 220 has been read. The incoming update 220 may comprise any modification to the state of the message inbox, and in particular a single modification operative to be performed via an atomic interaction with a message store.

The incoming update 220 may be received at a sender update queue 260. The sender update queue 260 may be specifically associated with the user of sender messaging endpoint 210, such as by being uniquely associated within the messaging system 100 with a user account for the user of sender messaging endpoint 210. The sender update queue 260 may be a single queue used for all messaging endpoints used by this user.

The sender update queue 260 may be organized as a data unit according to a variety of techniques. The sender update queue 260 may be stored in semi-persistent memory, persistent storage, both semi-persistent memory and persistent storage, or a combination of the two. The sender update queue 260 may be organized according to a variety of data structures, including linked lists, arrays, and other techniques for organizing queues. The sender update queue 260 may generally comprise a first-in-first-out (FIFO) queue in which no update will be removed from the queue before any updates that were received prior to it. This may be enforced through a strict requirement that the updates stored in the queue include a complete set of the integer sequence numbers from the oldest update in the sender update queue 260 to the newest update in the sender update queue 260.

Figure 2B:
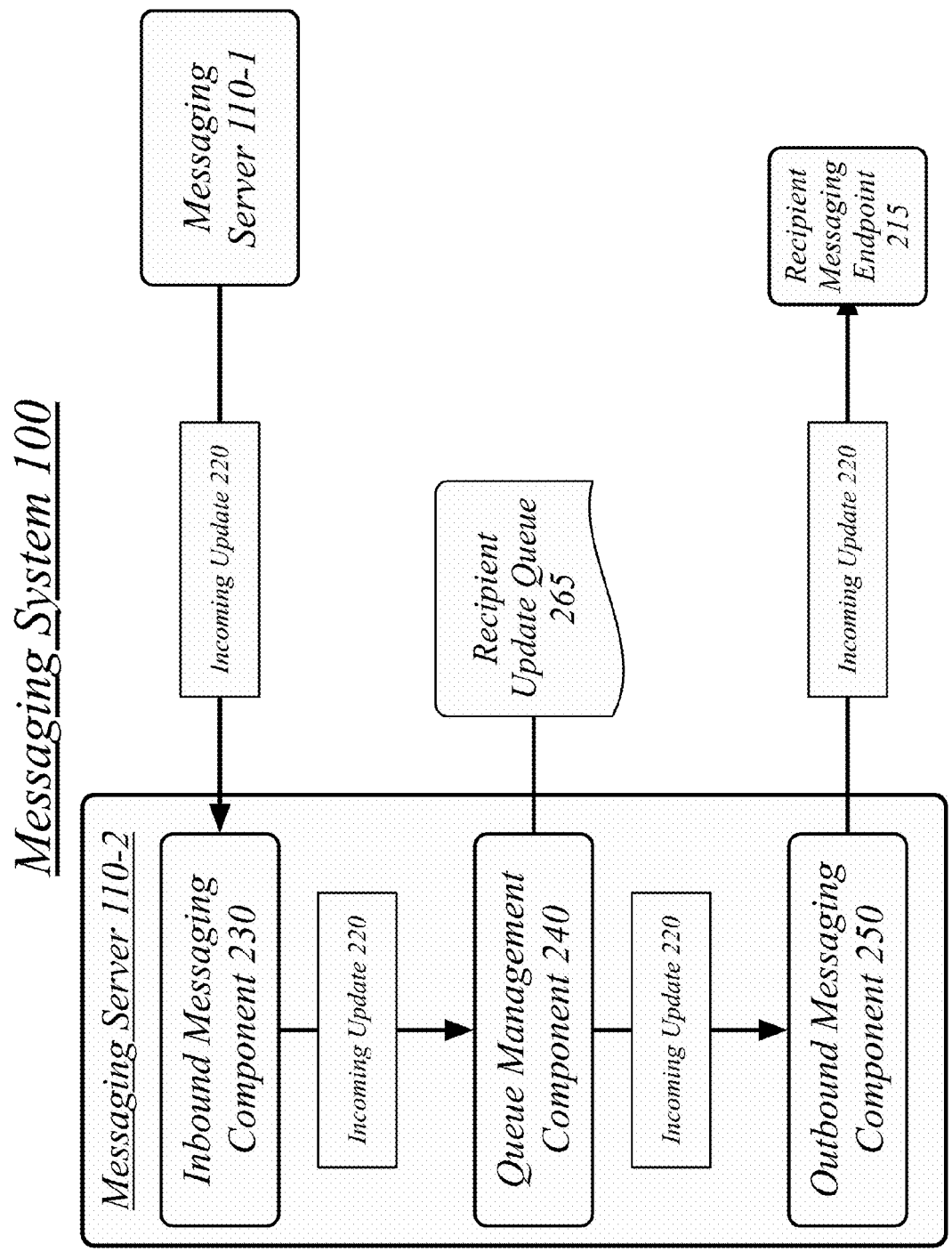
FIG. 2B illustrates an embodiment of a messaging server managing a recipient update queue.

FIG. 2B illustrates an embodiment of a messaging server 110-2 managing a recipient update queue 265.

The incoming update 220 may be received at the recipient update queue 265 from a sender update queue 260 associated with a sender of the incoming update 220. The recipient update queue 265 may be maintained by a messaging server 110-2 substantially similar to the messaging server 110-1 maintaining the sender update queue 260. The messaging server 110-2 may also comprise an inbound messaging component 230, queue management component 240, and outbound messaging component 250.

Once the update is placed into the update queue and assigned a sequence number one or more workers may be activated to process the update. An inbox replication group of one or more inbox replication workers may be activated to replicate the update to the inbox across all messaging endpoints associated with the update queue. One inbox replication worker may be activated for each messaging endpoint associated with the update queue. The inbox replication workers may transmit the update to each messaging endpoint as soon as it is available, which may include waiting for a messaging endpoint that is currently offline to come online.

An archival worker may be activated to transmit the update to archival storage for the message inbox associated with the update queue. Archival storage may include a message archive server. A message archive server may be substantially similar to a traditional mail server, and may be referenced where messages older than those stored in the update queue are to be retrieved. Archival storage may include a snapshot component, the snapshot component building an up-to-date snapshot of a current state of a message inbox for quick retrieval by a messaging endpoint that does not maintain state or a new messaging endpoint otherwise being initiated.

A distribution group of one or more distribution workers may be activated to forward the update to any other update queues associated with the update. For instance, if the update is the addition of a new message, the other update queues may be update queues for the recipients of the new message. One distribution worker may be activated for each additional update queue to receive the update. The distribution workers may transmit the update to each additional update queue as soon as it is available, which may include waiting for a messaging server maintaining an update queue that is currently offline—such as for planned or unplanned downtime—to come online.

Update queues may be replicated across multiple servers. For example, an update queue may be replicated in multiple geographic areas to provide faster access to the queue. For example, the messaging system 100 may be primarily based out of a first geographic area, with all of the update queues present in that first geographic area, with a local presence in additional geographic areas. A user in a second geographic area may have a replication of their update queue be present on a server in that second geographic area. In some cases, one of the replications of the update queue may be primary, with all new updates being sent to the update queue to be assigned a sequence number and then forwarded to the other replications of the update queue for faster access as various messaging endpoints associated with the update queue come online.

The incoming update 220 may correspond to an atomic modification to a message inbox for the recipient messaging endpoint 215. The recipient messaging endpoint 215 may comprise one of a messaging application on a device, such as a mobile device, and a web browser session. The recipient messaging endpoint 215 may comprise an archival mail server. The recipient messaging endpoint 215 may comprise a snapshot component maintaining a inbox snapshot for quick-setup of messaging inboxes.

The incoming update 220 may be received at the recipient update queue 265 from a sender update queue 260 associated with a sender of the incoming update. The sender update queue 260 may be maintained by a messaging server 110-1. The messaging server 110-1 may comprise a distinct messaging server or may be implemented by a same device as the first messaging server 110-2.

In some cases, the incoming update 220 may received at the recipient update queue 265 from a group discussion thread update queue, the group discussion thread update queue associated with a group discussion thread. A group discussion thread may comprise any form of ongoing conversation between two or more parties. Multiple messages from the a single participant may be included within the group discussion thread. In some cases, a user that joins an ongoing group discussion thread may only be privy to messages posted to the group discussion thread after their arrival. In some cases, a user that joins an ongoing group discussion thread may have access to the some portion of or the entire history of the group discussion thread prior to their arrival.

A group discussion thread may be associated with a group discussion thread update queue substantially similar to the sender update queue 260 and recipient update queue 265. However, the group discussion thread update queue may be a temporary queue created to specifically track the progress of a group discussion thread and distribute updates to the group discussion thread to one or more messaging endpoints for one or more participants. The group discussion thread update queue may be deleted or otherwise removed from storage and active maintenance at conclusion of the discussion.

In another embodiment, updates may not pass through the message queues of the group discussion thread participants. Instead, the group discussion thread participants may subscribe to the group discussion thread and directly insert and/or retrieve updates into the group discussion thread update queue. This may make the messaging endpoints of the participants the direct subscribers of the group discussion thread queue rather than the updates for the group discussion thread queue being passed through their respective message queues.

Other special-purpose update queues may be created that are not associated with maintaining a message inbox for a particular user. For example, a network-based application may be associated with an application update queue. A particular instance of one or more user's interaction with an application may be associated with an application update queue. For example, communication for an online multiplayer game may be implemented using an application update queue. Updates on the application update queue may correspond to player moves in the online multiplayer game, chat messages in a chat for the game, and other game status updates.

The incoming update 220 may be received at a recipient update queue 265 from the sender update queue 260. The recipient update queue 265 may be associated with one recipient of one or more recipients of the incoming update 220. A recipient may be determined for an incoming update 220 according to a variety of criteria. Where the incoming update 220 corresponds to a new message being sent to other users, the recipients of the update 220 may comprise a recipient list created as part of the composition of the new message by the sender. Where the incoming update 220 corresponds to an updated status of the sender on a social networking service, the recipient list may be determined by the social networking service based on relationships (e.g., friends, follows, likes) of which the sender is part. Where the incoming update 220 corresponds to a posted item shared on a network, the recipient list may be determined by the network based on users tagged in the shared item (e.g., users tagged as present in a photo). Where the incoming update 220 corresponds to a modification to a user's inbox, such as the deletion of a message, flagging a priority for a message, flagging a message as read, or other interaction only or primarily relevant to the user with which the message inbox is associated, the recipient list may be empty, such that no other users—and therefore no other message queues—receive the incoming update 220.

As with the sender update queue 260, the recipient update queue 265 may comprise a representation of updates in a strict linear order with a monotonically and incrementally increasing assignment of sequence numbers to represent the strict linear order of updates. The recipient update queue 265 may generally comprise a first-in-first-out (FIFO) queue in which no update will be removed from the queue before any updates that were received prior to it. This may be enforced through a strict requirement that the updates stored in the queue include a complete set of the integer sequence numbers from the oldest update in the recipient update queue 265 to the newest update in the recipient update queue 265. The recipient update queue 265 may be organized as a data unit according to a variety of techniques.

Figure 3A:
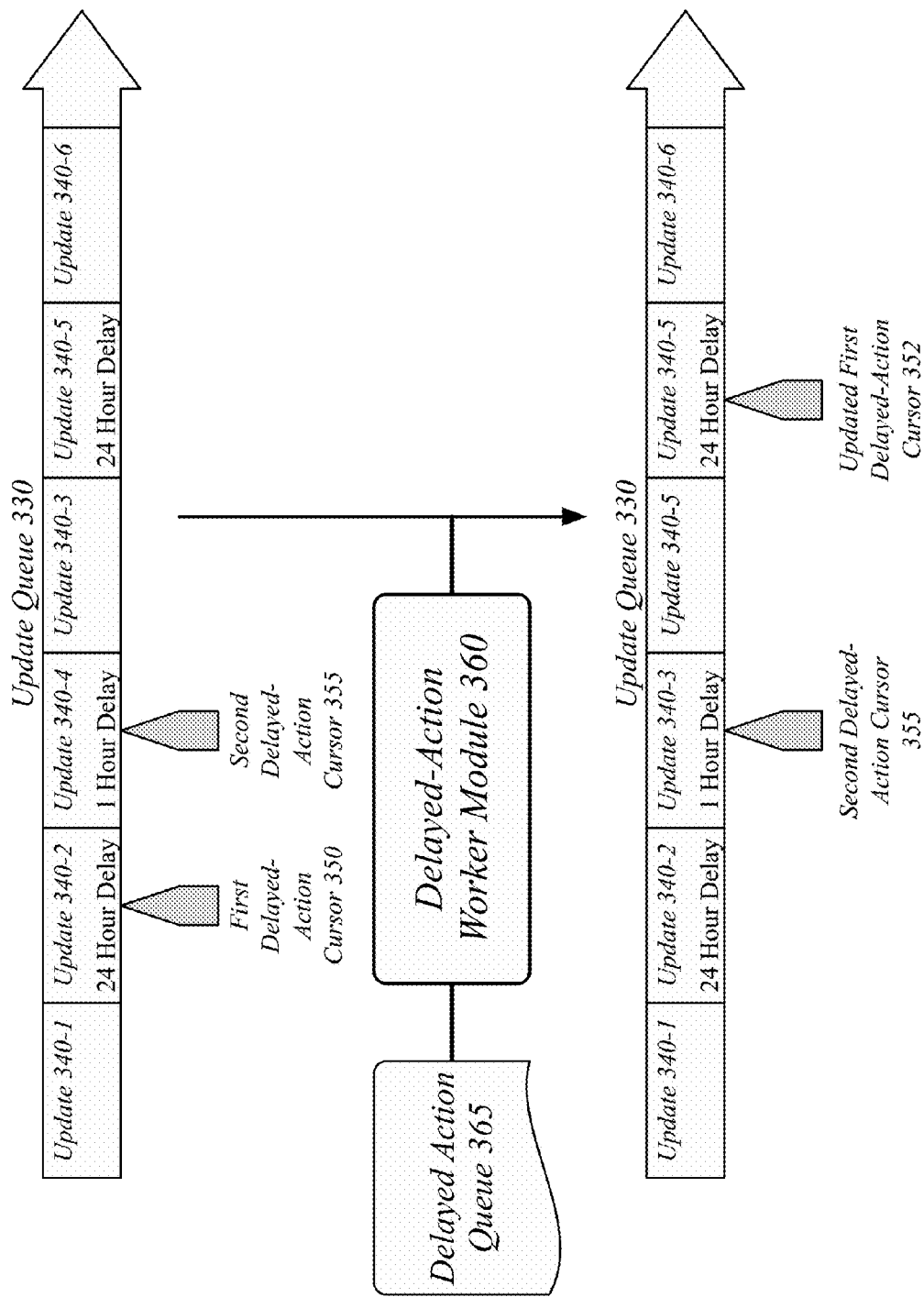
FIG. 3A illustrates an embodiment of a delay cursor being processed and updated.

FIG. 3A illustrates an embodiment of a delay cursor being processed and updated.

An update queue may comprise to an ordered sequence of updates 340 to a mailbox for a user of the messaging system 100. Update queues such as the sender update queue 260 and recipient update queue 265 may be manipulated in atomic operations performed by workers. Workers may be implemented by worker threads. Workers may lock an update queue prior to modifying the update queue, perform their tasks, and then unlock the update queue after the task is performed. Where multiple workers have tasks to perform on a particular update queue—for example, there are multiple incoming updates—the multiple workers may be queued or otherwise put on hold and allowed to act in sequence.

Some updates may be associated with a delayed action with an assigned action delay. These updates may be processed by a delayed-action worker performing a delayed-action worker module 360. For instance, in the performance of ephemeral messaging, a delayed action may correspond to the deletion of a message, with the action delay corresponding to the period of availability for ephemeral messages prior to their deletion.

In another instance, a delayed action may correspond to the archiving of a message, with the action delay corresponding to, in some embodiments, a maximum time before a message is archived. In some embodiments, an archival worker may archive a message prior to the maximum time and mark the message as archived, such that at the extinction of the archival action delay a delayed-action worker may examine the message, determine that it has already been archived, and then refrain from its own archiving of the messaging.

In another instance, a delayed action may correspond to the sending of an automated reply. In some embodiments, an automated reply may only be sent if the user receiving the messages—on whose behalf the automated reply would be sent—has not replied within a defined period of time. For example, a business may allow one or more employees assigned to responding to messages directed to the business an hour to respond, after which an automated response is generated and transmitted to the sender of the message. An automated response may comprise a common response sent to all senders, or may be generated based on the sending user account and/or the contents of the sent message.

Some updates of the plurality of updates 340 may be associated with an assigned action delay and delayed action. Where a messaging system 100 supports only a single delayed action, such as automated delete, the delayed action may be implicit based upon the existence of an action delay. Where a messaging system 100 supports a plurality of delayed actions, the delayed action may be specified according to a field of the storage of an update. Alternatively, a field may be assigned for each type of delayed action, with the field indicating an assigned action delay, if any. In some cases, multiple delayed actions may be assigned to a particular update.

Each action delay for an update queue 330 may be associated with a particular delay cursor, with a delay cursor corresponding to a progression forwards (i.e., in chronological order, progressing from the least recent to the most recent) through an update queue 330. A delay cursor may be assigned, at any point in time, to a particular update of the plurality of updates 340 comprising the update queue 330, the delay cursor's assignment recording the progress through the update queue 330.

Action delays may be confined to a predefined set of predefined action delays. A predefined set of action delays may constrain the number of cursors and thereby the amount of data storage dedicated to the performance of delayed-action tasks as each cursor may be associated with a defined or minimum amount of data storage, such as for a delayed action queue 365. Without a predefined number of available action delays, the number of cursors, and therefore the amount of data storage dedicated to the performance of delayed-action tasks, may be unbounded and therefore impractical for implementation by a messaging system 100.

A cursor may be progressed through an update queue 330 by a delayed-action worker module 360. In the illustrated embodiment of FIG. 3A, two updates 340-2, 340-5 have been assigned a common delay of twenty-four hours, with a different update 340-4 assigned a delay of one hour. A first delayed-action cursor 350 associated with a twenty-four action delay is assigned to the earlier update 340-2 with a twenty-four hour action delay, waiting on the extinction of the action delay. A second delayed-action cursor 355 may be assigned to a different update 340-4, the update 340-4 having a one-hour delay in the illustrated embodiment.

The delayed-action worker module 360 may wait upon the extinction of the action delay assigned to the update 340-2 to which the first delayed-action cursor 350 is assigned. Upon the extinction of the action delay, the delayed-action worker module 360 may perform a delayed-action activity for the update 340-2. The delayed-action worker module 360 may then update the first delayed-action cursor 350 to an update first delay cursor 352 assigned to the next update 340-5 with the particular action delay with which it is associated. The delayed-action worker module 360 may scan forward through the update queue 330, examining each update in turn, until it reaches the next update with that action delay, thereafter assigning the updated first delay cursor 352 to the first update 340-5 the delayed-action worker module 360 finds with the particular action delay that it tracks. As such, the delayed-action worker module 360 may only consider each update once for each delay cursor. Once the next update 340-5 has been found, the delayed-action worker module 360 may set a wake timer to wake the delayed-action worker module 360 at the extinction of the action delay for the next update 340-5. Due to the chronological ordering of the update queue 330, the next update 340-5 may be guaranteed to be the next update of that particular action delay within the update queue 330. This process may be performed for every delayed-action cursor for every update queue operated by the messaging system 100.

A delayed-action worker module 360 may be operative to wake according to a wake timer and determine a current update object for a delayed-action cursor 350 for a recipient update queue 330 for a messaging system 100, the delayed-action cursor 350 associated with an action delay for the recipient update queue 330. An update object may correspond to the data storage for a particular update. The delayed-action worker module 360 may determine a delayed-action activity for the current update object and perform the delay-action activity for the current update object. The delayed-action worker module 360 may determine a next update object 340-5 for the delayed-action cursor 350 for the recipient update queue 330 and determine a next wake timer for the delayed-action worker module 360 based on the action delay and a creation time for the next update object 340-5. Determining the next update object for the delayed-action cursor 350 for the recipient update queue 330 may comprise scanning chronologically forwards through the recipient update queue 330 until the next update object with a delayed-action indicator corresponding to the action delay is found. A wake time may be determined as the creation time plus the action delay. A delay to the wake time may be determined as the action delay minus the time elapsed since the creation time.

In some embodiments, the delayed-action worker module 360 may maintain a delayed action queue 365. The delayed action queue 365 may store an ordered sequence of updates associated with a particular delayed-action cursor, wherein each of the updates in the delayed-action queue 365 has an assigned delayed-action activity and a common action delay.

A delayed-action cursor may be associated with a delayed-action queue 365 associated with the action delay. Determining the next update object for the delayed-action cursor for the recipient update queue 330 may comprise retrieving the next update object from the delayed-action queue. The delayed-action worker module 360 may thereafter scan chronologically forwards through the recipient update queue 330 adding update objects to the delayed-action queue where the update objects have a delayed-action indicator corresponding to the action delay. In some embodiments, the delayed-action worker module 360 may stop the scanning when the delayed-action queue reaches a predefined maximum size, delaying until the delayed-action queue falls below the maximum size.

In some embodiments, the delayed-action worker module 360 may maintain a plurality of delayed action queues, one for each of a plurality of action delays supported by the messaging system 100. In these embodiments, the delayed-action worker module 360 may be able to only examine each update once when scanning through an update queue 330 and to add each update to the appropriate delayed-action queue—to the delayed-action queue associated with the action delay associated with an update—when discovered during the scanning.

Figure 3B:
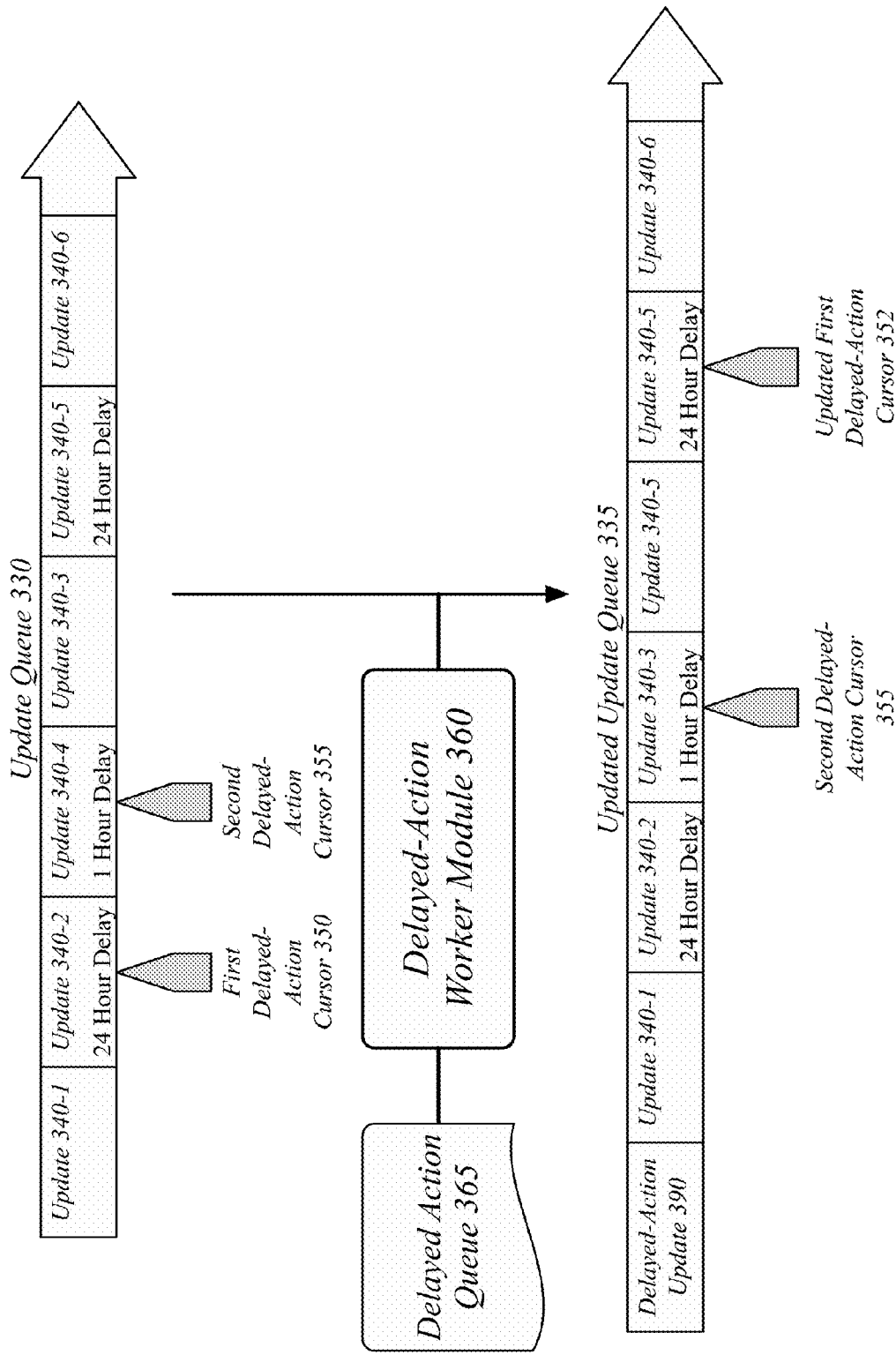
FIG. 3B illustrates an embodiment of a delay cursor processing adding a delayed-action update to an update queue.

FIG. 3B illustrates an embodiment of a delay cursor processing adding a delayed-action update 390 to an update queue 330.

In some cases, the delayed-action activity may comprise adding a message-delete command object as a delayed-action update 390 to the recipient update queue 330. The action delay may be defined according to an ephemeral-messaging setting for a message thread of the messaging system 100.

In some cases, the delayed-action activity may comprise updating a message archive with the current update object. An archive may maintain a recording of all messages—or all messages that haven't been deleted—in long-term storage. In some cases, an archive may comprise a snapshot store storing short-term snapshots of the contents of a user's mailbox, such as may be used to load a mailbox onto a messaging endpoint that isn't sufficiently up-to-date to receive messages from an update queue 330.

In some cases, the delayed-action activity may comprise sending an automated reply to the current update object. Sending an automated reply may comprise adding an update object corresponding to the automated reply to the update queue for the sender of the message being automatically replied to. Sending an automated reply may further comprise adding an update object corresponding to the automated reply to the update queue for the recipient of the messages being automatically replied to, the user on whose behalf the automated reply is being performed, so that the automated reply is available to the user on whose behalf the automated reply is performed in a listing of sent messages. The delayed-action worker module 360 may determine that the current update object hasn't been manually replied to prior to sending the automated reply, such as by referencing a replied-to indicator for the current update object.

In some cases, the period for the removal of a message may start with the viewing of the message by the recipient. As such, the current update object may comprise a read receipt for a message, wherein the delayed-action activity comprises adding a message-delete command object for the message to the recipient update queue. By being invoked by the read receipt, the instruction for the deletion of the message may be generated once the action delay period has elapsed after the viewing of the message by the recipient.

Figure 4:
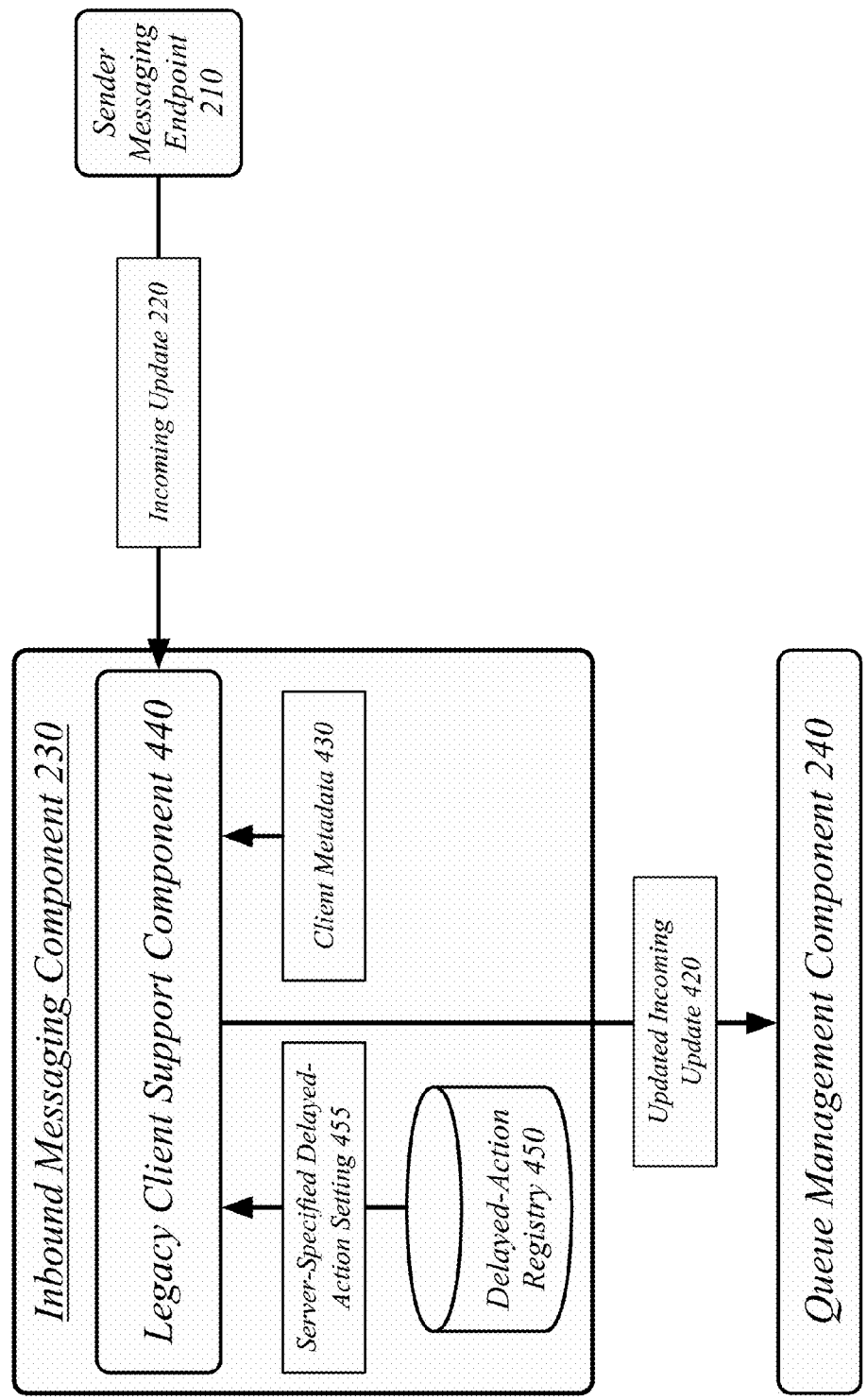
FIG. 4 illustrates an embodiment of a legacy client support component updating an incoming update.

FIG. 4 illustrates an embodiment of a legacy client support component updating an incoming update.

A messaging client on a client device may assign a particular message thread, category of media (e.g., photos), individual message, or other messaging unit a delayed-action setting. In some cases, this may comprise an ephemeral-messaging setting. In one case, an ephemeral-messaging setting may be applied to a message thread by a messaging client supporting explicit ephemeral-messaging activities. The messaging client may apply an ephemeral-messaging setting to a message thread and implement the deletion of any messages for the message thread itself without depending on deletion commands added to the update queue. The deletion commands may therefore serve to remove ephemeral messages from legacy clients while non-legacy clients remove ephemeral messages themselves upon the extinction of the ephemeral delay period.

The assignment of an ephemeral, or other delayed-action setting, to a message thread may be a binary operation in which ephemeral messaging is turned on through an interface option, with a single ephemeral messaging period defined for the messaging system 100. Alternatively, a plurality of ephemeral messaging delays may be supported and selected between by the user of the messaging client. In any case, a delayed-action setting, including an ephemeral-messaging setting, may be communicated by a messaging client to the messaging system 100 and applied to associated messages, including the deletion of messages by legacy clients under an ephemeral-messaging setting.

A legacy client support component 440 may operate as an element of the inbound messaging component 230. The legacy client support component 440 may update an incoming update 220 to produce an updated incoming update 420 including metadata the setting of which is not support by a legacy messaging client. The legacy client support component 440 may access a delayed-action registry 450 to determine the settings to apply to the metadata of an incoming update 220, the delayed-action registry 450 indicating the delayed-action setting(s) to be applied to incoming updates and the criteria on which they are to be applied, such as for a particular message thread, media type, client device, or other category.

A sender inbound messaging component 230 may be operative to receive an incoming update 220 for a message queue at a client support server for a messaging system from a messaging client on a client device. A client support server may comprise the messaging server 110-1 to which the client device is connected.

The legacy client support component 440 may be operative to determine whether the messaging client supports a client-side delayed-action setting, such as a time-to-live setting. In one embodiment, a metadata field of the incoming update 220 may indicate a version number for the messaging client, with the legacy client support component 440 determining whether the messaging client supports a client-side delayed-action setting based on a comparison between the a version number specified in the metadata and a minimum version number to support a client-side delayed-action setting. In another embodiment, the legacy client support component 440 may determine whether the messaging client supports a client-side delayed-action setting by determining whether the delayed-action setting is specified in the metadata, with a messaging client that supports a client-side delayed-action setting indicating whether or not one or more delayed-action activities are assigned to each update and/or message, and therefore a messaging client that does not support a client-side delayed-action setting being inferred from the lack of an indication in the metadata as to the one or more delayed-action activities.

The legacy client support component 440 may determine whether the incoming update 220 should be associated with a server-specified delayed-action setting 455 where the messaging client does not support the client-side delayed-action setting; and assign the incoming update 220 the server-specified delayed-action setting 455 where the messaging client does not support the client-side delayed-action setting and where the incoming update should be associated with a server-side delayed-action setting. Assigning the incoming update 220 the server-specified delayed-action setting 455 may comprise adding the server-specified delayed-action setting 455 to the metadata for the incoming update 220 to produce the updated incoming update 420 prior to transfer of the updated incoming update 420 to the queue management component 240.

The delayed-action registry 450 for a particular user account may be stored on disk or remote storage device, such as a network storage device, when not in use by the legacy client support component 440. In some embodiments, the delayed-action registry 450 may be fetched and cached in memory when needed. Where the messaging client does not support the client-side delayed-action setting, the legacy client support component 440 may determine that a delayed-action registry 450 is not cached in memory on the client support server, retrieve the delayed-action registry 450; determine whether the incoming update should be associated with the server-specified delayed-action setting 455 based on the delayed-action registry 450; and cache the delayed-action registry 450 in memory on the client support server. The delayed-action registry 450 may also be fetched and loaded when its information is changed by a non-legacy client, such as when a non-legacy clients registers a change in a delayed-action setting, such as assigning a message thread, media channel, individual message, or client device as being associated with a delayed-action setting.

In some embodiments, the delayed-action registry 450 associated with a user account may be loaded when a messaging client associated with the user account connects to a messaging server from a client device, maintained in memory for a duration of the network connection, and then removed from memory—either written to longer-term storage or simply deleted, if unchanged. The delayed-action registry 450 may be loaded even where a non-legacy client connects, so as to be available if the non-legacy client changes a delayed-action setting. The legacy client support component 440 may receive a notification of an opening of a network connection with the messaging client on the client device; determine whether the messaging client supports the client-side delayed-action setting in response to receiving the notification of the opening of the network connection with the messaging client on the client device, such as via an indication of the messaging client's version number in client metadata 430 received in association with the opening of the network connection; and cache a delayed-action registry 450 in memory on the client support server for a duration of the network connection where the messaging client does not support the client-side delayed-action setting. Thereafter, where the messaging client does not support the client-side delayed-action setting, the legacy client support component 440 may determine that the delayed-action registry 450 is cached in memory on the client support server and determine whether the incoming update 220 should be associated with the server-specified delayed-action setting 455 based on the delayed-action registry 450.

In some cases, the legacy client support component 440 may determine whether the incoming update 220 should be associated with the server-specified time-to-live setting based on the delayed-action registry 450, the delayed-action registry 450 comprising a listing of message threads associated with time-to-live settings. In other cases, the legacy client support component 440 may determine whether the incoming update 220 should be associated with the server-specified time-to-live setting based on a delayed-action registry, the delayed-action registry comprising a listing of media channels associated with time-to-live settings. The delayed-action registry 450 may correspond to a time-to-live registry, with the delayed-action setting(s) corresponding to time-to-live setting(s).

In some cases, a client device may be migrated between messaging servers. In these cases, the delayed-action registry 450 may be transferred between messaging servers. Similarly, the contents of any delayed action queue 365 may also be transferred between messaging servers when a delayed-action worker module 360 is transferred between messaging servers. The state of a delay cursor may be stored on disk, but with the delayed-action worker module 360 performed in memory. The messaging server to which the delayed-action worker module 360 is transferred may instantiate a thread, load the delayed-action worker module 360 into the thread, and then activate the delayed-action worker module 360 to check whether any actions are to be performed.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 5A illustrates one embodiment of a logic flow 500. The logic flow 500 may be representative of some or all of the operations executed by one or more embodiments described herein.

In the illustrated embodiment shown in FIG. 5A, the logic flow 500 may wake a delayed-action worker according to a wake timer at block 502.

The logic flow 500 may determine a current update object for a delayed-action cursor for a recipient update queue for a messaging system, the delayed-action cursor associated with an action delay for the recipient update queue at block 504.

The logic flow 500 may determine a delayed-action activity for the current update object at block 506.

The logic flow 500 may perform the delay-action activity for the current update object at block 508.

The logic flow 500 may determine a next update object for the delayed-action cursor for the recipient update queue at block 510.

The logic flow 500 may determine a next wake timer for the delayed-action worker based on the action delay and a creation time for the next update object at block 512.

The embodiments are not limited to this example.

Figure 5B:
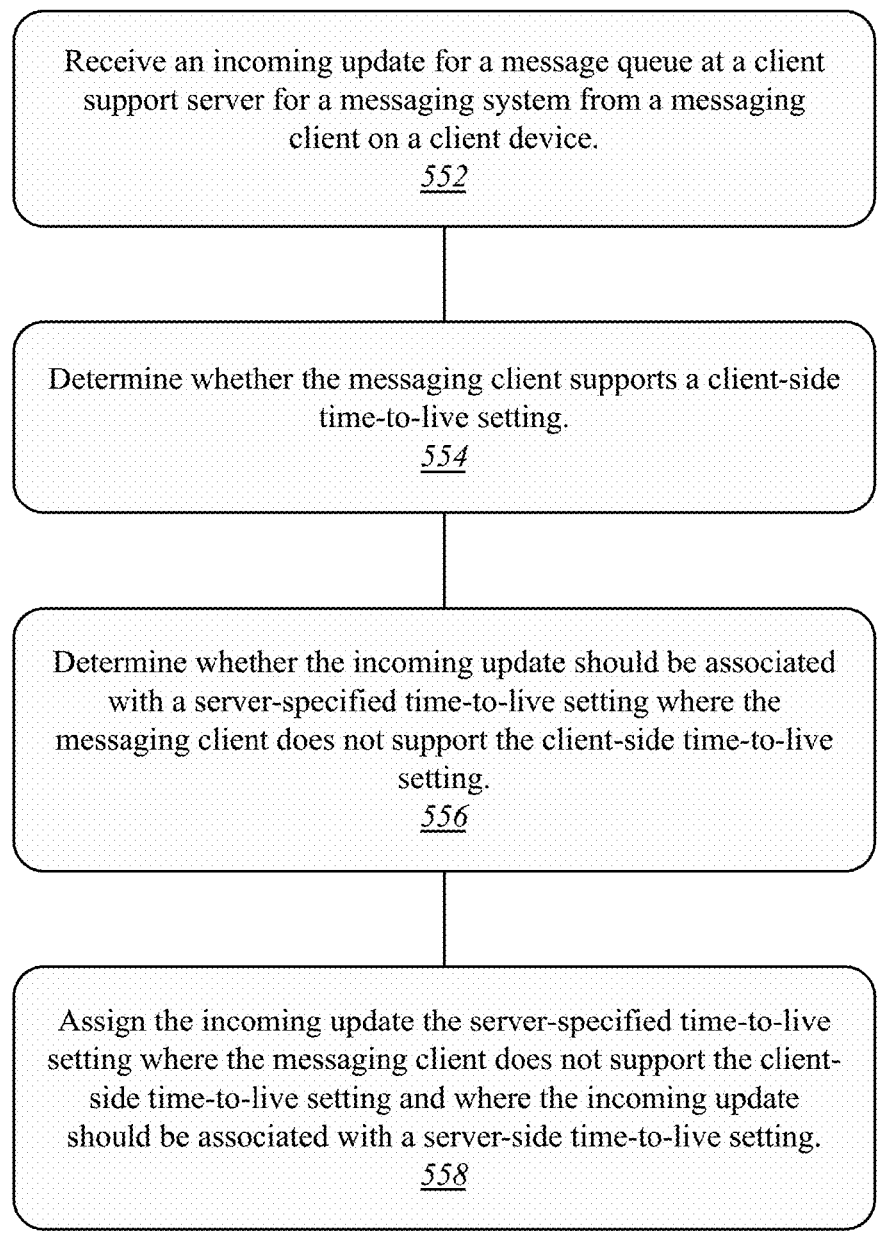
FIG. 5 illustrates an embodiment of a logic flow for the system of FIG. 1.

FIG. 5B illustrates one embodiment of a logic flow 550. The logic flow 550 may be representative of some or all of the operations executed by one or more embodiments described herein.

In the illustrated embodiment shown in FIG. 5B, the logic flow 550 may receive an incoming update for a message queue at a client support server for a messaging system from a messaging client on a client device at block 552.

The logic flow 550 may determine whether the messaging client supports a client-side time-to-live setting at block 554.

The logic flow 550 may determine whether the incoming update should be associated with a server-specified time-to-live setting where the messaging client does not support the client-side time-to-live setting at block 556.

The logic flow 550 may assign the incoming update the server-specified time-to-live setting where the messaging client does not support the client-side time-to-live setting and where the incoming update should be associated with a server-side time-to-live setting at block 558.

The embodiments are not limited to this example.

Figure 6:
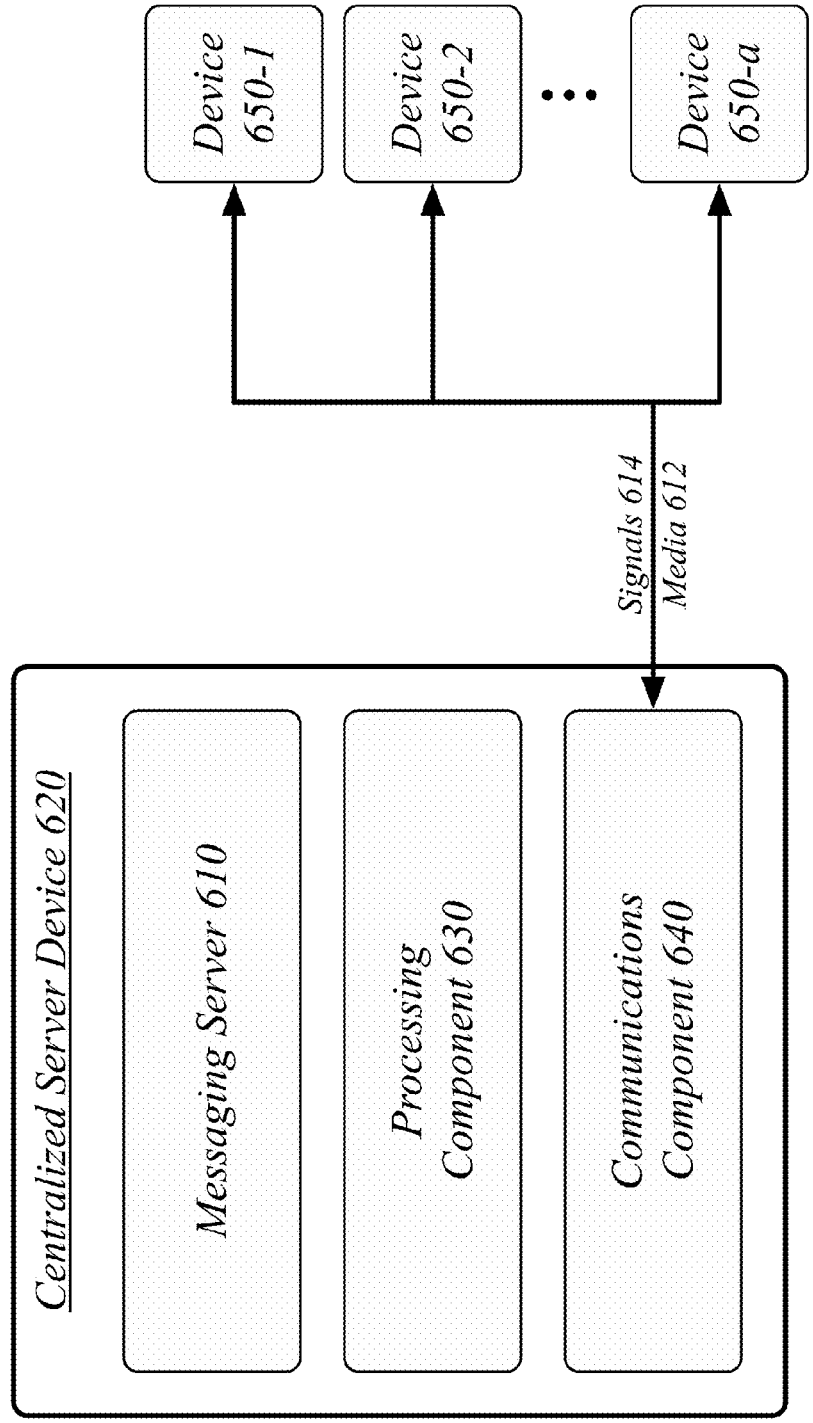
FIG. 6 illustrates an embodiment of a centralized system for the system of FIG. 1.

FIG. 6 illustrates a block diagram of a centralized system 600. The centralized system 600 may implement some or all of the structure and/or operations for the messaging system 100 in a single computing entity, such as entirely within a single centralized server device 620.

The centralized server device 620 may comprise any electronic device capable of receiving, processing, and sending information for the messaging system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized server device 620 may execute processing operations or logic for the messaging system 100 using a processing component 630. The processing component 630 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized server device 620 may execute communications operations or logic for the messaging system 100 using communications component 640. The communications component 640 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 640 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 612 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The centralized server device 620 may communicate with client devices 650 over a communications media 612 using communications signals 614 via the communications component 640. The centralized server device 620 may implement a messaging server 610 supporting a plurality of client devices 650 in regards to the operations described herein.

Figure 7:
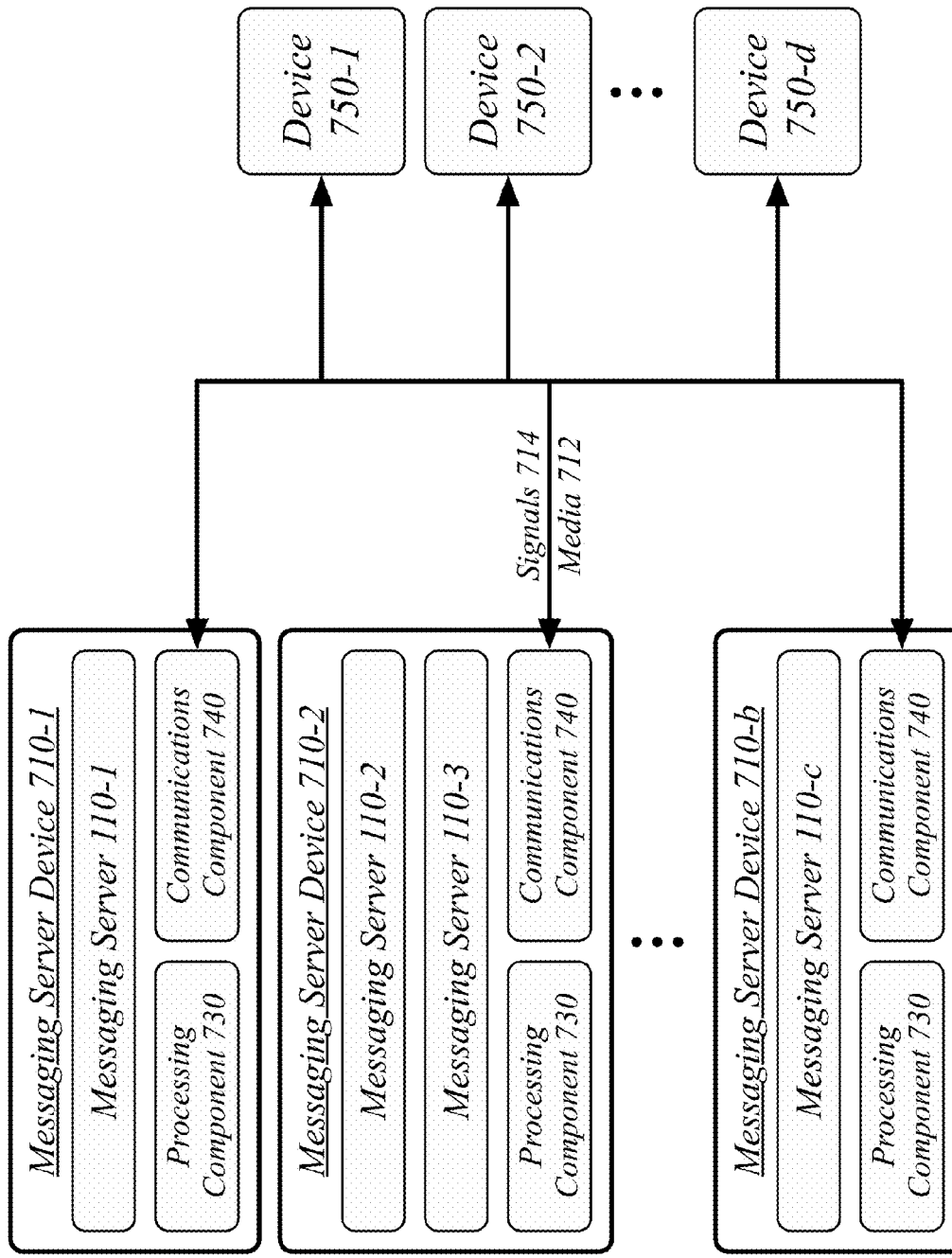
FIG. 7 illustrates an embodiment of a distributed system for the system of FIG. 1.

FIG. 7 illustrates a block diagram of a distributed system 700. The distributed system 700 may distribute portions of the structure and/or operations for the messaging system 100 across multiple computing entities. Examples of distributed system 700 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 700 may comprise a plurality of server devices 710. In general, the server devices 710 may be the same or similar to the centralized server device 620 as described with reference to FIG. 6. For instance, the server devices 710 may each comprise a processing component 730 and a communications component 740 which are the same or similar to the processing component 630 and the communications component 640, respectively, as described with reference to FIG. 6. In another example, the server devices 710 may communicate over a communications media 712 using communications signals 714 via the communications components 740.

The messaging server devices 710 may comprise or employ one or more client programs that operate to perform various methodologies in accordance with the described embodiments. In one embodiment, for example, the server devices 710 may each implement one or more messaging server of a plurality of messaging servers 110. The server devices may communicate with client devices 750 via signals 714 sent of media 712.

Figure 8:
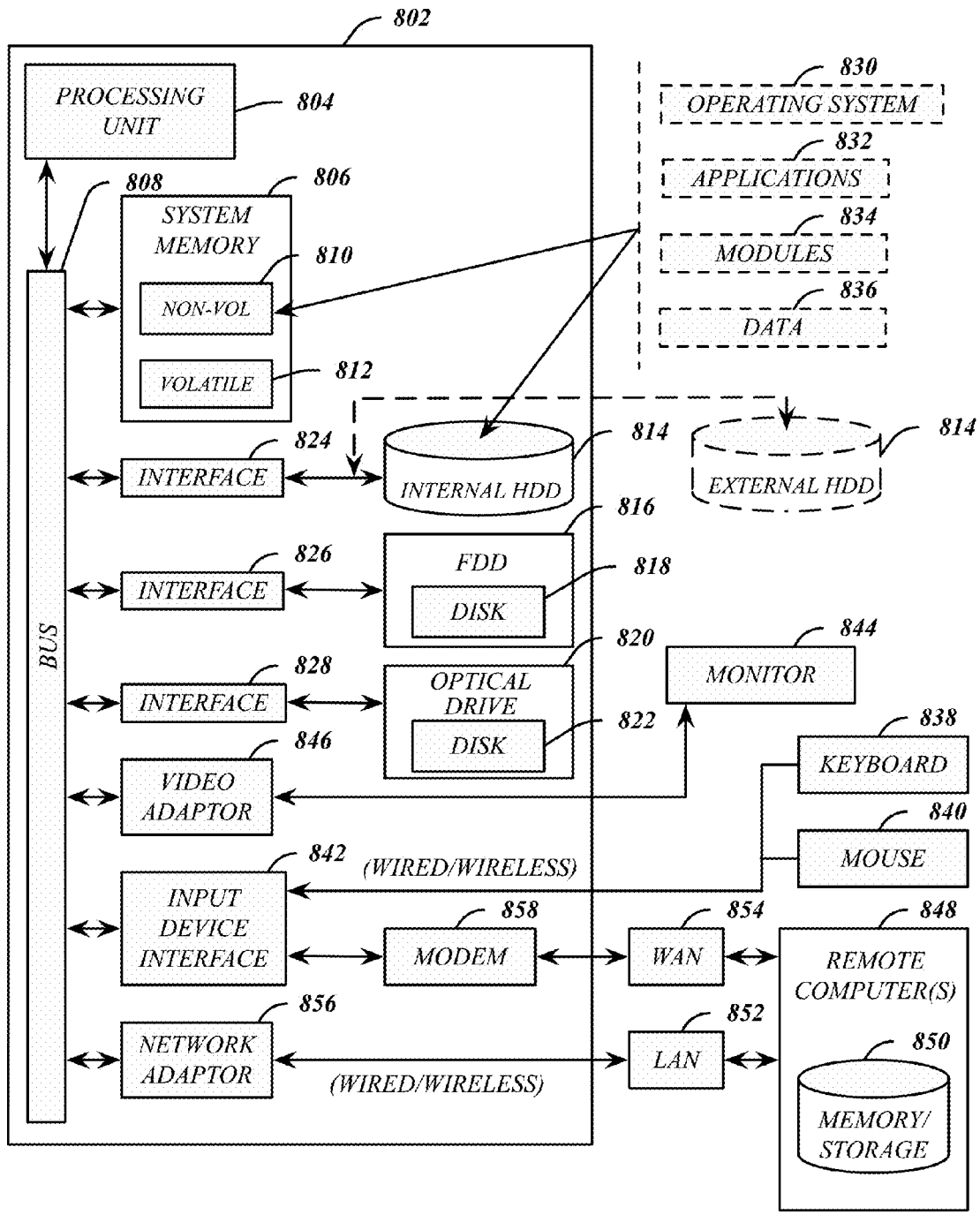
FIG. 8 illustrates an embodiment of a computing architecture.

FIG. 8 illustrates an embodiment of an exemplary computing architecture 800 suitable for implementing various embodiments as previously described. In one embodiment, the computing architecture 800 may comprise or be implemented as part of an electronic device. Examples of an electronic device may include those described with reference to FIG. 6, 7, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multiprocessor architectures may also be employed as the processing unit 804.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 800 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of the messaging system 100.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.8 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.8x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 9:
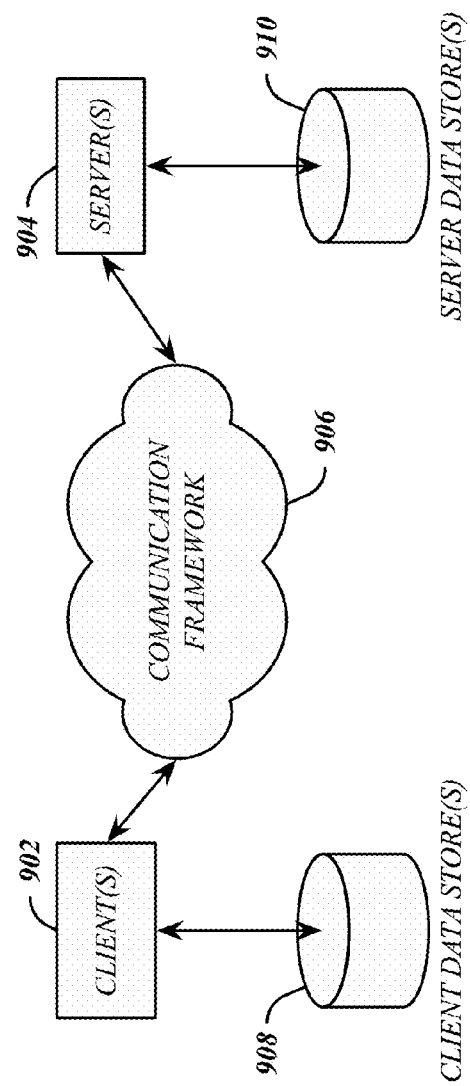
FIG. 9 illustrates an embodiment of a communications architecture.

FIG. 9 illustrates a block diagram of an exemplary communications architecture 900 suitable for implementing various embodiments as previously described.

The communications architecture 900 includes various common communications elements, such as a transmitter, receiver, transceiver, radio, network interface, baseband processor, antenna, amplifiers, filters, power supplies, and so forth. The embodiments, however, are not limited to implementation by the communications architecture 900.

As shown in FIG. 9, the communications architecture 900 comprises includes one or more clients 902 and servers 904. The clients 902 may implement the client devices 650, 750. The servers 904 may implement the server devices 620, 710. The clients 902 and the servers 904 are operatively connected to one or more respective client data stores 908 and server data stores 910 that can be employed to store information local to the respective clients 902 and servers 904, such as cookies and/or associated contextual information.

The clients 902 and the servers 904 may communicate information between each other using a communication framework 906. The communications framework 906 may implement any well-known communications techniques and protocols. The communications framework 906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 906 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 902 and the servers 904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 10:
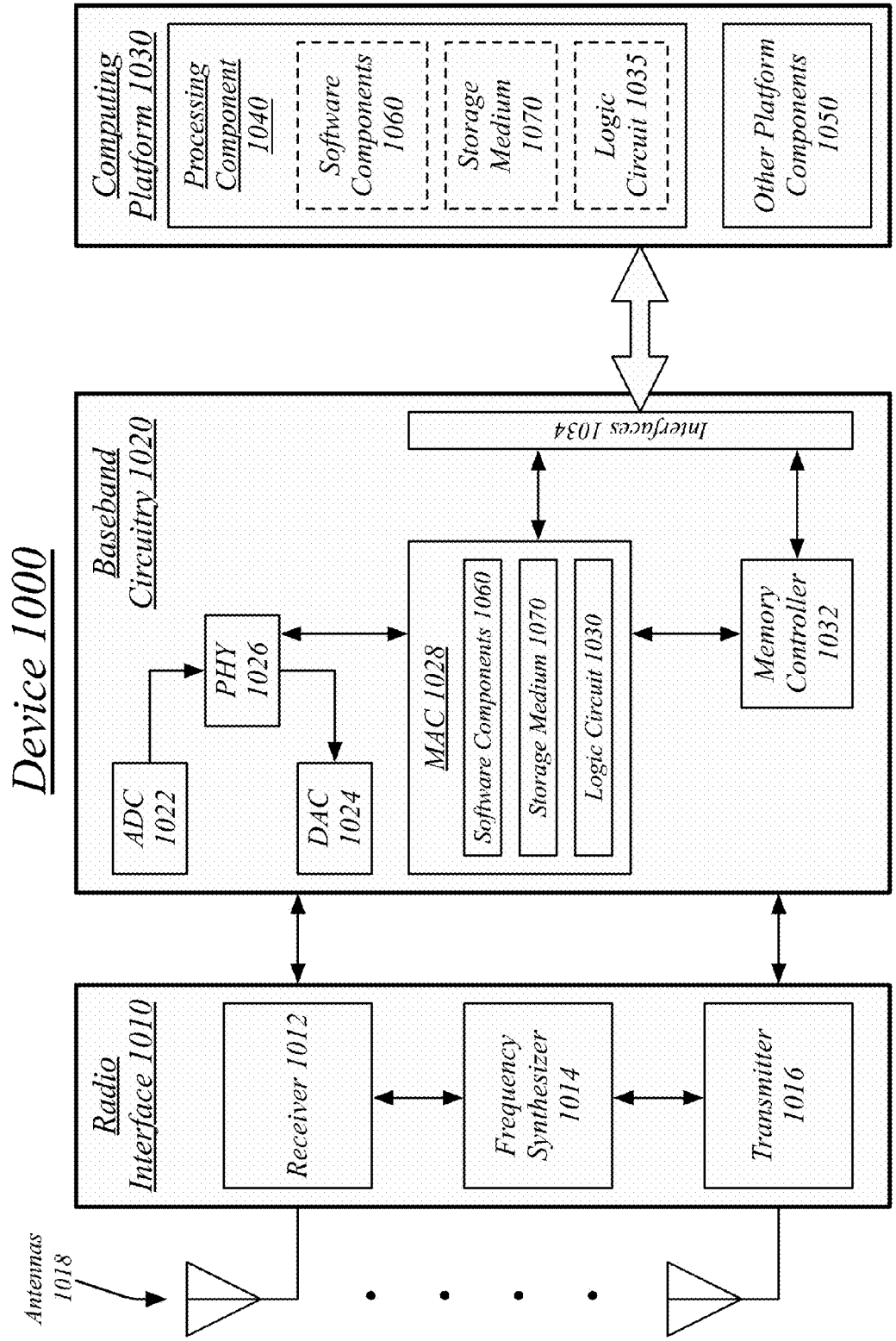
FIG. 10 illustrates an embodiment of a radio device architecture.

FIG. 10 illustrates an embodiment of a device 1000 for use in a multicarrier OFDM system, such as the messaging system 100. Device 1000 may implement, for example, software components 1060 as described with reference to messaging system 100 and/or a logic circuit 1035. The logic circuit 1035 may include physical circuits to perform operations described for the messaging system 100. As shown in FIG. 10, device 1000 may include a radio interface 1010, baseband circuitry 1020, and computing platform 1030, although embodiments are not limited to this configuration.

The device 1000 may implement some or all of the structure and/or operations for the messaging system 100 and/or logic circuit 1035 in a single computing entity, such as entirely within a single device. Alternatively, the device 1000 may distribute portions of the structure and/or operations for the messaging system 100 and/or logic circuit 1035 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1010 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1010 may include, for example, a receiver 1012, a transmitter 1016 and/or a frequency synthesizer 1014. Radio interface 1010 may include bias controls, a crystal oscillator and/or one or more antennas 1018. In another embodiment, radio interface 1010 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1020 may communicate with radio interface 1010 to process receive and/or transmit signals and may include, for example, an analog-to-digital converter 1022 for down converting received signals, a digital-to-analog converter 1024 for up converting signals for transmission. Further, baseband circuitry 1020 may include a baseband or physical layer (PHY) processing circuit 1056 for PHY link layer processing of respective receive/transmit signals. Baseband circuitry 1020 may include, for example, a processing circuit 1028 for medium access control (MAC)/data link layer processing. Baseband circuitry 1020 may include a memory controller 1032 for communicating with processing circuit 1028 and/or a computing platform 1030, for example, via one or more interfaces 1034.

In some embodiments, PHY processing circuit 1026 may include a frame construction and/or detection module, in combination with additional circuitry such as a buffer memory, to construct and/or deconstruct communication frames, such as radio frames. Alternatively or in addition, MAC processing circuit 1028 may share processing for certain of these functions or perform these processes independent of PHY processing circuit 1026. In some embodiments, MAC and PHY processing may be integrated into a single circuit.

The computing platform 1030 may provide computing functionality for the device 1000. As shown, the computing platform 1030 may include a processing component 1040. In addition to, or alternatively of, the baseband circuitry 1020, the device 1000 may execute processing operations or logic for the messaging system 100 and logic circuit 1035 using the processing component 1040. The processing component 1040 (and/or PHY 1026 and/or MAC 1028) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1030 may further include other platform components 1050. Other platform components 1050 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1000 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1000 described herein, may be included or omitted in various embodiments of device 1000, as suitably desired. In some embodiments, device 1000 may be configured to be compatible with protocols and frequencies associated one or more of the 3GPP LTE Specifications and/or IEEE 1002.16 Standards for WMANs, and/or other broadband wireless networks, cited herein, although the embodiments are not limited in this respect.

Embodiments of device 1000 may be implemented using single input single output (SISO) architectures. However, certain implementations may include multiple antennas (e.g., antennas 1018) for transmission and/or reception using adaptive antenna techniques for beamforming or spatial division multiple access (SDMA) and/or using MIMO communication techniques.

The components and features of device 1000 may be implemented using any combination of discrete circuitry, application specific integrated circuits (ASICs), logic gates and/or single chip architectures. Further, the features of device 1000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1000 shown in the block diagram of FIG. 10 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise waking a delayed-action worker according to a wake timer; determining a current update object for a delayed-action cursor for a recipient update queue for a messaging system, the delayed-action cursor associated with an action delay for the recipient update queue; determining a delayed-action activity for the current update object; performing the delay-action activity for the current update object; determining a next update object for the delayed-action cursor for the recipient update queue; and determining a next wake timer for the delayed-action worker based on the action delay and a creation time for the next update object.

A computer-implemented method may further comprise wherein the delayed-action activity comprises adding a message-delete command object to the recipient update queue.

A computer-implemented method may further comprise the action delay defined according to an ephemeral-messaging setting for a message thread of the messaging system.

A computer-implemented method may further comprise wherein the delayed-action activity comprises updating a message archive with the current update object.

A computer-implemented method may further comprise wherein the delayed-action activity comprises sending an automated reply to the current update object, further comprising: determining that the current update object hasn't been manually replied to prior to sending the automated reply.

A computer-implemented method may further comprise wherein determining the next update object for the delayed-action cursor for the recipient update queue comprises scanning chronologically forwards through the recipient update queue until the next update object with a delayed-action indicator corresponding to the action delay is found.

A computer-implemented method may further comprise wherein the delayed-action cursor is associated with a delayed-action queue associated with the action delay, wherein determining the next update object for the delayed-action cursor for the recipient update queue comprises retrieving the next update object from the delayed-action queue.

A computer-implemented method may further comprise scanning chronologically forwards through the recipient update queue adding update objects to the delayed-action queue where the update objects have a delayed-action indicator corresponding to the action delay.

A computer-implemented method may further comprise stopping the scanning when the delayed-action queue reaches a predefined maximum size.

A computer-implemented method may further comprise the current update object comprising a read receipt for a message, wherein the delayed-action activity comprises adding a message-delete command object for the message to the recipient update queue.

An apparatus may comprise a processor circuit on a device; a delayed-action worker module operative on the processor circuit to wake according to a wake timer; determine a current update object for a delayed-action cursor for a recipient update queue for a messaging system, the delayed-action cursor associated with an action delay for the recipient update queue; determine a delayed-action activity for the current update object; perform the delay-action activity for the current update object; determine a next update object for the delayed-action cursor for the recipient update queue; and determine a next wake timer for the delayed-action worker module based on the action delay and a creation time for the next update object. The apparatus may be operative to implement any of the computer-implemented methods described herein.

A computer-implemented method may comprise receiving an incoming update for a message queue at a client support server for a messaging system from a messaging client on a client device; determining whether the messaging client supports a client-side time-to-live setting; determining whether the incoming update should be associated with a server-specified time-to-live setting where the messaging client does not support the client-side time-to-live setting; and assigning the incoming update the server-specified time-to-live setting where the messaging client does not support the client-side time-to-live setting and where the incoming update should be associated with a server-side time-to-live setting.

A computer-implemented method may further comprise wherein the incoming update corresponds to an atomic modification to a message inbox for the messaging client on the client device.

A computer-implemented method may further comprise wherein the messaging client does not support the client-side time-to-live setting, further comprising: determining that a time-to-live registry for the client device is not cached in memory on the client support server; retrieving the time-to-live registry for the client device; determining whether the incoming update should be associated with the server-specified time-to-live setting based on the time-to-live registry for the client device; and caching the time-to-live registry in memory on the client support server.

A computer-implemented method may further comprise receiving a notification of an opening of a network connection with the messaging client on the client device; determining whether the messaging client supports the client-side time-to-live setting in response to receiving the notification of the opening of the network connection with the messaging client on the client device; and caching a time-to-live registry in memory on the client support server for a duration of the network connection where the messaging client does not support the client-side time-to-live setting.

A computer-implemented method may further comprise wherein the messaging client does not support the client-side time-to-live setting, further comprising: determining that a time-to-live registry for the client device is cached in memory on the client support server; and determining whether the incoming update should be associated with the server-specified time-to-live setting based on the time-to-live registry for the client device.

A computer-implemented method may further comprise wherein the messaging client does not support the client-side time-to-live setting, further comprising: determining whether the incoming update should be associated with the server-specified time-to-live setting based on a time-to-live registry for the client device, the time-to-live registry comprising a listing of message threads associated with time-to-live settings.

A computer-implemented method may further comprise wherein the messaging client does not support the client-side time-to-live setting, further comprising: determining whether the incoming update should be associated with the server-specified time-to-live setting based on a time-to-live registry for the client device, the time-to-live registry comprising a listing of media channels associated with time-to-live settings.

An apparatus may comprise a processor circuit on a device; a sender inbound messaging component operative on the processor circuit to receive an incoming update for a message queue at a client support server for a messaging system from a messaging client on a client device; a legacy client support component operative on the processor circuit to determine whether the messaging client supports a client-side time-to-live setting; determine whether the incoming update should be associated with a server-specified time-to-live setting where the messaging client does not support the client-side time-to-live setting; and assign the incoming update the server-specified time-to-live setting where the messaging client does not support the client-side time-to-live setting and where the incoming update should be associated with a server-side time-to-live setting. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising:
   receiving an incoming update for a message queue at a client support server for a messaging system from a messaging client on a client device;
   determining whether the messaging client supports a client-side time-to-live setting;
   determining whether the incoming update should be associated with a server-specified time-to-live setting where the messaging client does not support the client-side time-to-live setting; and
   assigning the incoming update the server-specified time-to-live setting where the messaging client does not support the client-side time-to-live setting and where the incoming update should be associated with a server-side time-to-live setting.

2. The method of claim 1, wherein the incoming update corresponds to an atomic modification to a message inbox for the messaging client on the client device.

3. The method of claim 1, wherein the messaging client does not support the client-side time-to-live setting, further comprising:
   determining that a time-to-live registry for the client device is not cached in memory on the client support server;
   retrieving the time-to-live registry for the client device;
   determining whether the incoming update should be associated with the server-specified time-to-live setting based on the time-to-live registry for the client device; and
   caching the time-to-live registry in memory on the client support server.

4. The method of claim 1, further comprising:
   receiving a notification of an opening of a network connection with the messaging client on the client device;
   determining whether the messaging client supports the client-side time-to-live setting in response to receiving the notification of the opening of the network connection with the messaging client on the client device; and
   caching a time-to-live registry in memory on the client support server for a duration of the network connection where the messaging client does not support the client-side time-to-live setting.

5. The method of claim 1, wherein the messaging client does not support the client-side time-to-live setting, further comprising:
   determining that a time-to-live registry for the client device is cached in memory on the client support server; and
   determining whether the incoming update should be associated with the server-specified time-to-live setting based on the time-to-live registry for the client device.

6. The method of claim 1, wherein the messaging client does not support the client-side time-to-live setting, further comprising:
   determining whether the incoming update should be associated with the server-specified time-to-live setting based on a time-to-live registry for the client device, the time-to-live registry comprising a listing of message threads associated with time-to-live settings.

7. The method of claim 1, wherein the messaging client does not support the client-side time-to-live setting, further comprising:
   determining whether the incoming update should be associated with the server-specified time-to-live setting based on a time-to-live registry for the client device, the time-to-live registry comprising a listing of media channels associated with time-to-live settings.

8. An apparatus, comprising:
   a processor circuit on a device;
   a sender inbound messaging component operative on the processor circuit to receive an incoming update for a message queue at a client support server for a messaging system from a messaging client on a client device;
   a legacy client support component operative on the processor circuit to determine whether the messaging client supports a client-side time-to-live setting; determine whether the incoming update should be associated with a server-specified time-to-live setting where the messaging client does not support the client-side time-to-live setting; and assign the incoming update the server-specified time-to-live setting where the messaging client does not support the client-side time-to-live setting and where the incoming update should be associated with a server-side time-to-live setting.

9. The apparatus of claim 8, wherein the incoming update corresponds to an atomic modification to a message inbox for the messaging client on the client device.

10. The apparatus of claim 8, wherein the messaging client does not support the client-side time-to-live setting, further comprising:
    the legacy client support component operative to determine that a time-to-live registry for the client device is not cached in memory on the client support server; retrieve the time-to-live registry for the client device; determine whether the incoming update should be associated with the server-specified time-to-live setting based on the time-to-live registry for the client device; and cache the time-to-live registry in memory on the client support server.

11. The apparatus of claim 8, further comprising:
    the legacy client support component operative to receive a notification of an opening of a network connection with the messaging client on the client device; determine whether the messaging client supports the client-side time-to-live setting in response to receiving the notification of the opening of the network connection with the messaging client on the client device; and cache a time-to-live registry in memory on the client support server for a duration of the network connection where the messaging client does not support the client-side time-to-live setting.

12. The apparatus of claim 8, wherein the messaging client does not support the client-side time-to-live setting, further comprising:
    the legacy client support component operative to determine that a time-to-live registry for the client device is cached in memory on the client support server; and determine whether the incoming update should be associated with the server-specified time-to-live setting based on the time-to-live registry for the client device.

13. The apparatus of claim 8, wherein the messaging client does not support the client-side time-to-live setting, further comprising:
    the legacy client support component operative to determine whether the incoming update should be associated with the server-specified time-to-live setting based on a time-to-live registry for the client device, the time-to-live registry comprising a listing of message threads associated with time-to-live settings.

14. The apparatus of claim 8, wherein the messaging client does not support the client-side time-to-live setting, further comprising:
    the legacy client support component operative to determine whether the incoming update should be associated with the server-specified time-to-live setting based on a time-to-live registry for the client device, the time-to-live registry comprising a listing of media channels associated with time-to-live settings.

15. At least one non-transitory computer-readable storage medium comprising instructions that, when executed, cause a system to:
    receive an incoming update for a message queue at a client support server for a messaging system from a messaging client on a client device, wherein the incoming update corresponds to an atomic modification to a message inbox for the messaging client on the client device;
    determine whether the messaging client supports a client-side time-to-live setting; determine whether the incoming update should be associated with a server-specified time-to-live setting where the messaging client does not support the client-side time-to-live setting; and
    assign the incoming update the server-specified time-to-live setting where the messaging client does not support the client-side time-to-live setting and where the incoming update should be associated with a server-side time-to-live setting.

16. The non-transitory computer-readable storage medium of claim 15, wherein the messaging client does not support the client-side time-to-live setting, comprising further instructions that, when executed, cause a system to:
    determine that a time-to-live registry for the client device is not cached in memory on the client support server; retrieve the time-to-live registry for the client device; determine whether the incoming update should be associated with the server-specified time-to-live setting based on the time-to-live registry for the client device; and cache the time-to-live registry in memory on the client support server.

17. The non-transitory computer-readable storage medium of claim 15, comprising further instructions that, when executed, cause a system to:
    receive a notification of an opening of a network connection with the messaging client on the client device;
    determine whether the messaging client supports the client-side time-to-live setting in response to receiving the notification of the opening of the network connection with the messaging client on the client device; and
    cache a time-to-live registry in memory on the client support server for a duration of the network connection where the messaging client does not support the client-side time-to-live setting.

18. The non-transitory computer-readable storage medium of claim 15, wherein the messaging client does not support the client-side time-to-live setting, comprising further instructions that, when executed, cause a system to:
    determine that a time-to-live registry for the client device is cached in memory on the client support server; and
    determine whether the incoming update should be associated with the server-specified time-to-live setting based on the time-to-live registry for the client device.

19. The non-transitory computer-readable storage medium of claim 15, wherein the messaging client does not support the client-side time-to-live setting, comprising further instructions that, when executed, cause a system to: determine whether the incoming update should be associated with the server-specified time-to-live setting based on a time-to-live registry for the client device, the time-to-live registry comprising a listing of message threads associated with time-to-live settings.

20. The non-transitory computer-readable storage medium of claim 15, wherein the messaging client does not support the client-side time-to-live setting, comprising further instructions that, when executed, cause a system to: determine whether the incoming update should be associated with the server-specified time-to-live setting based on a time-to-live registry for the client device, the time-to-live registry comprising a listing of media channels associated with time-to-live settings.

* * * * *